US012776560B2

(12) United States Patent
Howe

(10) Patent No.: US 12,776,560 B2
(45) Date of Patent: Oct. 27, 2026

(54) EXTENDIBLE MAST WITH INTEGRATED TRANSMISSION ELEMENT

(71) Applicant: RTL Materials Ltd., Lymington (GB)

(72) Inventor: Matthew Howe, Lymington (GB)

(73) Assignee: RTL MATERIALS LTD., Lymington (GB)

( * ) Notice: Subject to any disclaimer, the term of this patent is extended or adjusted under 35 U.S.C. 154(b) by 290 days.

(21) Appl. No.: 18/242,330

(22) Filed: Sep. 5, 2023

(65) Prior Publication Data

US 2024/0079756 A1 Mar. 7, 2024

(30) Foreign Application Priority Data

Sep. 7, 2022 (GB) ..................................... 2213081

(51) Int. Cl.

| | |
|---|---|
| ***H01Q 1/10*** | (2006.01) |
| ***B29C 70/34*** | (2006.01) |
| ***B29L 23/00*** | (2006.01) |
| ***H01Q 1/12*** | (2006.01) |

(52) U.S. Cl.

CPC ............. *H01Q 1/103* (2013.01); *B29C 70/34* (2013.01); *H01Q 1/1235* (2013.01); *B29L 2023/22* (2013.01)

(58) Field of Classification Search

CPC ...... B64G 1/222; B64G 1/2225; B64G 1/223; H01Q 1/087; H01Q 1/103; H01Q 1/1235; E04C 3/005; B29C 70/34; B29C 70/302; B32B 27/08; B32B 1/08

See application file for complete search history.

(56) References Cited

U.S. PATENT DOCUMENTS 3,331,075 A 7/1967 Moulton
3,524,190 A * 8/1970 Derling ................ H01Q 13/203 333/237
4,446,466 A 5/1984 Maehl
6,217,975 B1 4/2001 Daton-Lovett
10,124,545 B2 11/2018 Daton-Lovett (Continued)

FOREIGN PATENT DOCUMENTS

CN 110165362 B 2/2021
DE 102021102980 A1 * 8/2022 ........... B64G 1/2225

(Continued)

OTHER PUBLICATIONS

Extended European Search Report mailed Feb. 2, 2024 in corresponding European Patent Application No. EP23191493.8.

*Primary Examiner* — Theodore V Adamos
(74) *Attorney, Agent, or Firm* — Troutman Pepper Locke LLP

(57) ABSTRACT

An extendible mast (1) for deploying equipment comprises a composite member formed from plural fibre reinforced layers (75) laminated together in a matrix material in the form of a shell that is constructed and arranged so as to be configurable between a coiled form and an extended form. When extended the member is resiliently biased in the form of an elongate tube having a slit along its length formed by longitudinal edges of the member. One or more electrical conductors (50) extend along at least part of the longitudinal extent of the member for making connection to the equipment. The conductors are integrated between two or more layers within the laminate.

18 Claims, 6 Drawing Sheets

(56) References Cited

U.S. PATENT DOCUMENTS

| | | | | |
|---|---|---|---|---|
| 11,435,067 | B1 | 9/2022 | Wood et al. | |
| 2015/0259911 | A1* | 9/2015 | Freebury | E04H 12/18 52/108 |
| 2016/0223131 | A1 | 8/2016 | Daton-Lovett | |
| 2017/0016746 | A1 | 1/2017 | Daton-Lovett | |
| 2018/0287240 | A1* | 10/2018 | Davis | H01Q 1/087 |
| 2019/0317293 | A1* | 10/2019 | Cox | G01M 11/085 |
| 2021/0277655 | A1* | 9/2021 | Daton-Lovett | B32B 37/06 |

FOREIGN PATENT DOCUMENTS

| | | | | |
|---|---|---|---|---|
| GB | 2510340 | A | 8/2014 | |
| GB | 2517991 | A | 3/2015 | |
| WO | 02/25057 | A1 | 3/2002 | |
| WO | WO-2020101488 | A1 * | 5/2020 | H01Q 1/38 |

* cited by examiner

EXTENDIBLE MAST WITH INTEGRATED TRANSMISSION ELEMENT

This application claims the benefit of British Patent Application Serial No. 2213081.9 filed 7 Sep. 2022 titled Extendible Mast with Integrated Transmission Element, which is hereby incorporated by reference herein in its entirety.

TECHNICAL FIELD

The present invention relates to an extendible mast with integrated transmission element(s) and/or electrical conductor(s), a method of manufacturing such a mast and methods of deploying and stowing equipment carried by the mast in use.

BACKGROUND

There are many scenarios where it is desired to deploy equipment via an extendible structure, i.e. a mast. As used in the present disclosure, the term "mast" is intended to refer to any arm, mast, pole, boom or elongate structural element suitable for this purpose. It is known for example to mount cameras, tools, PV cells, sensors and antennas on a boom so they can be deployed in the field by extending the boom to position and support the equipment as required in use. The mast can be retracted when not in use or for transportation or storage. Known types of mast can comprise, for example, telescopic elements, jointed or articulated elements, a series of elements that screw together end on end, slit tubular structures (STEMS) that can be coiled for compact storage and driven between the coiled and extended forms. The present application relates particularly to STEM type masts, and preferably to bistable STEM type masts as described further herein.

In many scenarios, it is also necessary to provide electrical services to the apparatus at the distal (i.e. extended) end of the mast. For instance, electrical power or control/data signals may need to be transmitted to and/or received from the apparatus at the proximal, i.e. coiled, end of the mast to local transmitting/receiving equipment at the distal end. Thus, electrical transmission elements, e.g. electrical cables, wires or traces, may be used to connect the apparatus to local equipment. Such elements require careful management so as not to interfere with the ability of the mast to extend/retract or become damaged for example due to snagging or interfering with the extension/retraction mechanism. Such elements can also make deploying the apparatus more time consuming and awkward. Cycle life of the product is also an important consideration, as many applications require such booms to be deployed, i.e. extended to position and support the equipment, and stowed, i.e. coiled to achieve a compact form when not in use, multiple times, possibly 100s or 1000s or more.

The applicant's US 2016/0223131A describes an arrangement whereby coaxial cables, hoses, and the like are incorporated with a mast, such as an antenna mast, by attaching a fabric pocket along the side edge of the mast which loosely accommodates the cable. Thus, the mast and cable can co-coil. By putting the cable "outboard" of the mast its bulk interferes minimally with the ability of the mast to form a compact coil whilst still being managed. While these techniques are useful in some scenarios, e.g. for relatively bulky coaxial cables and the like, they rely on a post-production step of attaching the cable to the mast, and are less suited to potentially more complicated or delicate transmission elements which may for instance require multiple data signals and power lines to power complicated electronic equipment being deployed, e.g. digital video cameras, sensors, lighting and the like.

In the applicant's US 2017/0016746 A1, a bistable rollable tube is disclosed as a means for deploying fibre optics as part of a communications infrastructure rollout, or for condition monitoring applications, where the fibre optic strands may be embedded within the composite structure. However these techniques have narrow applicability and may be not be suitable for transmitting more complicated signals or power as required by complicated electronic equipment being deployed.

U.S. Pat. No. 3,331,075A discloses an extendible antenna mast which antenna elements are mounted to the surface of the mast connected by surface electrical conductors.

What is needed is ways of transmitting signals/power to equipment having greater applicability and able to work with a wider variety of equipment, whilst being simple to deploy, robust in use, and being practical to manufacture.

SUMMARY

According to a first aspect of the present invention, there is provided an extendible mast for deploying equipment, comprising:

- a composite member formed from plural fibre reinforced layers laminated together in a matrix material in the form of a shell that is constructed and arranged so as to be configurable between a coiled form and an extended form, wherein when extended the member is resiliently biased in the form of an elongate tube having a slit along its length formed by longitudinal edges of the member and wherein when coiled the member is opened out at the longitudinal edges to a flattened form and wound about an axis extending transversely to the longitudinal extent of the member; and,
- one or more electrical conductors extending along at least part of the longitudinal extent of the member for making connection to the equipment, wherein the conductors are integrated between two or more layers within the laminate.

In an embodiment, at least one of the conductors is positioned at or near the neutral axis of the mast.

For instance, the conductors may be positioned such that path length differences induced strain is less than 5%, and/or between whichever layers put is closest to the neutral axis. This reduces strains experienced by the conductors during the coiling/extending process and helps promote the lifespan of the product by avoiding damage to the conductors or cracking, delamination etc. to the composite.

In an embodiment, one or more layers of fibre has a cut-out portion or portions along the length of the mast to accommodate some or all of the conductors.

This helps maintain uniformity of the product across its width by accommodating the bulk of the conductors within the space created by omitting part of one or more layers of fibre along the length of the mast and again helps promote the lifespan of the product. As discussed herein various techniques can be used to compensate for any loss of stiffness occasioned by the omitted fibre.

In an embodiment, the cut-out layer is 0 or 90 degree orientation fibre.

In an embodiment, the layup is, in order, one or more outer layer having angled fibre, one or more inner layers having 0 or 90 degree fibres, and one or more inner layers having angled fibre.

In an embodiment, there are plural 0 or 90 layers, and at least one of the conductors is encased between at least two such layers.

In an embodiment, an inner or outer layer has an aperture to allow at least one of the conductors to emerge from the body of the mast partway along its length.

In an embodiment, the fibre layup of the mast is modified at one or both ends compared with a main middle section of the mast to locally decrease the stiffness of the mast in a region where at least one of the conductors leaves the mast providing strain relief to the conductor.

In an embodiment, at least some of the conductors are a ribbon cable.

In an embodiment, the at least some of the conductors are a twisted pair or cable.

In an embodiment, at least one of the conductors is coated with a substance to promote bonding with the matrix material of the composite.

In an embodiment, the conductors are not closer to the edge of the STEM than 10% of the overall flattened width and/or the overall width of the conductors is not more than 50% of the overall width of the STEM.

In an embodiment, the equipment deployed by the mast or integrated within the mast is a camera, sensor, PV panel, antenna, lighting system, communication equipment or any combination thereof.

In an embodiment, the distal end of the mast has a mount adapted to attach to a tool or other device, optionally having a socket for receiving and fixing the end of the mast and optionally having means for attaching to at least one of the conductors in the mast.

In an embodiment, the mast comprising a connector on the mast for externally connecting to the transmission element, wherein optionally:

the connector is a rotatable connector or a length of the conductor extends beyond the coiled end of the member and is in communication with the connector, wherein said length forms a coil wherein the tightness of the coil changes as the mast is extended and retracted such that an electrical connection can be maintained during rotation of the mast when it is uncoiled and or coiled.

In an embodiment, the member comprises a bistable material.

In an embodiment, the mast comprising a housing for containing the coiled mast and guiding the mast as it is extended.

According to a second aspect of the invention, there is provided an extendible mast for deploying equipment, comprising:

a composite member formed from plural fibre reinforced layers laminated together in a matrix material in the form of a shell that is constructed and arranged so as to be configurable between a coiled form and an extended form, wherein when extended the member is resiliently biased in the form of an elongate tube having a slit along its length formed by longitudinal edges of the member and wherein when coiled the member is opened out at the longitudinal edges to a flattened form and wound about an axis extending transversely to the longitudinal extent of the member; and, one or more transmission elements extending along at least part of the longitudinal extent of the member for making connection to the equipment, wherein the conductors are between two layers within the laminate and wherein at least one layer of the laminate is at least partially removed to accommodate the transmission element, wherein the transmission element is one more or electrical conductor for data and/or power, an optical fibre element, a hose for fluid flow.

According to a third aspect of the invention, there is provided a method of deploying equipment, the method comprising:

extending and or retracting an extendible mast according to any preceding claim, the mast supporting and/or positioning said apparatus; and providing services to the apparatus via the transmission element or electrical conductors.

According to a fourth aspect of the invention, there is provided a method of manufacturing a mast according to any preceding claim, the method comprising:

laying up layers of fibre and a transmission element or electrical conductors in a mould or on a former or in a continuous forming process;

applying heat and or pressure to consolidate into a composite product.

In the above aspects and embodiments, the electrical conductor(s) and/or transmission element(s) allow services to be provided and data or power exchanged to apparatus or equipment supported and/or positioned by the mast from equipment positioned at the other end of the mast or embedded or integrated into the mast itself, for example from a computing device to a sensor deployed by the mast, or from a receiver/transmitter to an antenna supported by the mast. The transmission element is flexible to allow it to coil with the member. For instance, where the mast is used to deploy an antenna, the transmission element may provide a coaxial cable so as to transmit/receive electrical signals to/from the antenna to an external transmitter/receiver device. The resiliently biased member provides structural support to the apparatus. The transmission element coils with the member to provide a compact form for storage or transportation. The mast can be quickly and simply deployed by simply extending the mast with the transmission element extending along with the mast. When the mast is coiled, the transmission element coils with the member, but does so adjacent the side edge of the member, i.e. outside the interstitial spaces of the coiled member, so as not to interfere with the coiling of the mast. Thus, the overall thickness of the coil is not disrupted by the transmission element getting in the way.

The mast can be any desired length, e.g. more than 1 m, more than 10 m, etc. Preferably, the length of the mast is at least 5 times the flattened width of the member. In the extended form, the member has an arcuate cross section, which can subtend any desired angle from relatively shallow angles, e.g. 60 degrees or more, to more closed sections, e.g. up to 360 degrees, to provide more stiffness. If desired, the edges of the member can overlap and/or be bonded or zipped together to provide further stability.

References to the near, proximal or local end of the mast used herein should be taken to refer to the end from which the mast coils, whereas references to the far, distal or remote end of the mast used herein should be taken to refer to the extended end of the mast.

The mast preferably coils about an axis transverse to the extension direction. In embodiments, the extended member is linear, although in alternative embodiments curved members can be formed.

In a preferred embodiment, the distal end of the mast has a mount adapted to attach to a tool or other device. This allows the tool or device to be removably attached to the mast. In this case, preferably a connector is provided with the mount to connect the transmission element to the tool or device. However, in other embodiments, a tool or device can be permanently attached to the mast and/or integrated into the composite of the mast, such as integrated antenna or LED lighting systems.

May be ribbon cable, i.e. parallel traces on a flexible membrane substrate. May be twisted pair, which is useful for rejecting cross talk or other interference, which may be a problem where at least part of the boom is coiled and thus the wires forming a loop.

In a preferred embodiment, the mast supports or incorporates an antenna for transmitting and/or receiving electromagnetic communications.

In a preferred embodiment, the mast is constructed and arranged to support loads of at least 1 kg.

In a preferred embodiment, the mast comprises a connector on the mast for externally connecting to the transmission element. This allows external equipment to simply and conveniently attach to the apparatus supported by the mast via the transmission element.

In a preferred embodiment, the connector is a rotatable connector. This can be useful in accommodating rotation of the coiled end of the mast as the mast is extended/retracted and helps guard against damage to the transmission means.

In an alternative embodiment, a length of the transmission element extends beyond the coiled end of the member and is in communication with the connector, wherein said length of the transmission element forms a coil wherein the tightness of the coil changes as the mast is extended and retracted. Thus, a rotatable connector is not required in this embodiment, as the movement of the coiled length of transmission element by becoming a tighter/looser coil accommodates the movement of the coiled end of the member as the mast is extended and retracted, i.e. in the manner of a hairspring "breathing" as the balance rotates back and forth in a mechanical watch or clock.

In a preferred embodiment, the transmission element cannot slip relative to the member, i.e. it is an integral part of the laminate product being bonded by the matrix material to the layers of fibre. The transmission element may also provide a structural strength or stiffness to the overall composite mast, e.g. the conductors are formed on a substrate that is flexible but has some structural strength or stiffness that contributes to that of the overall mast. In some embodiments, the stiffness and/or strength of the substrate can be selected to match that of the fibre layer it replaces, e.g. to with +−25%.

In a preferred embodiment, the mast comprises a housing for containing the coiled mast and guiding the mast as it is extended. In a preferred embodiment, the housing has a winding mechanism for coiling or extending the mast, or both. This can help deploy the apparatus via the mast, for example where the apparatus is heavy or difficult to manage.

It will be appreciated that any features expressed herein as being provided "in one example" or "in an embodiment" or as being "preferable" may be provided in combination with any one or more other such features together with any one or more of the aspects of the present invention.

BRIEF DESCRIPTION OF THE DRAWINGS

Embodiments of the present invention will now be described by way of example with reference to the accompanying drawings, in which.

DETAILED DESCRIPTION

Figure 1:
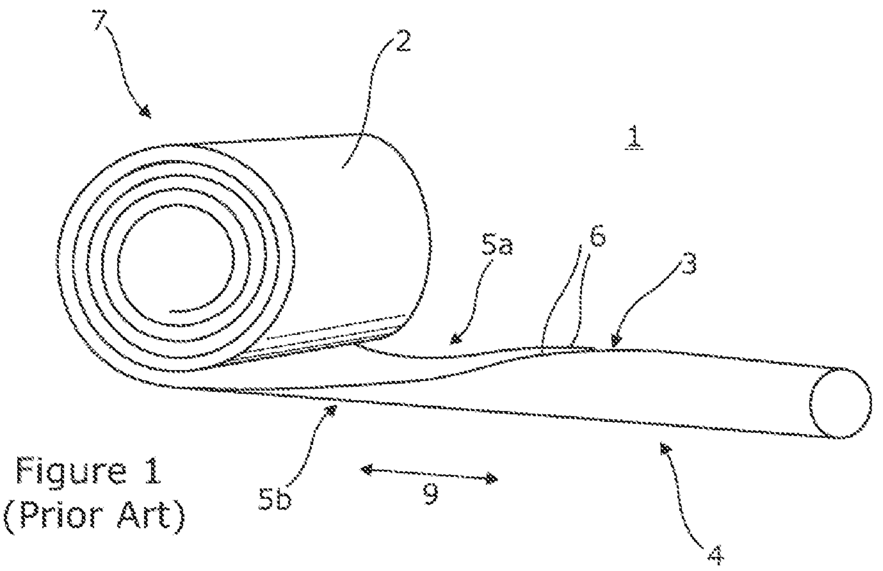
Figure 1 (Prior Art)
FIG. 1 shows a perspective view of an example of a bistable coilable and extendible member.

FIG. 1 shows an example of an extendible member 1. The member 1 comprises a fibre-reinforced composite body 2 having a first form in the shape of an elongate slit tube in which shape it is resiliently biased. The slit tube can be opened out at the longitudinal slit 3 defined by the longitudinal edges 6 of the tube so as to be substantially flat so that it can be coiled about an axis transverse to the longitudinal axis of the tube.

The member 1 is bistable, having a first stable form in the slit tube extended form 4 (in which it has a first curvature), and a second stable form when coiled into a coiled form 7 (in which it has a second curvature). Examples of bistable coilable members are disclosed in the Applicant's U.S. Pat. No. 6,217,975 the entire contents of which are hereby incorporated by reference. The member may be constructed with edges as described in the Applicant's US20210277655A1, the entire contents of which are hereby incorporated by reference, to increase performance of the members. Conventional methods can be used to make the composite or bistable member. Advantageous mechanised production methods of making a composite member are disclosed in the Applicant's U.S. Ser. No. 10/124,545B2 the entire contents are hereby incorporated by reference. Using a bistable member in this way means that the coiled sleeve is stable, meaning that it is easier to handle and store, etc.

In general, the member 1 is manufactured as a fibre-reinforced composite in which various plies of woven, braided or angled fibres 8 (shown in part in FIG. 1) are laid up in a mould or former and heat and/or pressure applied to melt the thermoplastic matrix material consolidate the layers into a composite product. To achieve bistability, at least two plies positioned in the layup towards the intrados 5*a* and/or extrados 5*b* faces of the tubular member (i.e. away from the neutral axis of bending of the member), are angled with respect to the longitudinal axis 9 of the product to as to create non-isotropic layers with a high Poisson's ratio. In known examples, a layup of plies with angles of +45, −45, 0, +45, −45 or +45, −45, 90, 0, 90, +45, −45 may be used. Generally the angled fibres are required to provide bistability and the 90 degree and 0 degree fibres are mainly to provide stiffness in the axial and hoop directions (0 degree being aligned with the axial direction and 90 degrees being aligned with the hoop direction). However, other layups are possible, and the composite construction may be adapted for specific use.

Thus, opening out the first curvature of the tube 4 gives rise to tension in the fibres 8 near the intrados face 5*a* which due to their angle has a component in the longitudinal direction which tends to cause a contraction in this layer in the longitudinal direction. As the tube is opened out to a flatter form, its bending stiffness in a transverse decreases. Once the component of the tension arising in the fibres in the longitudinal is sufficient to overcome the bending stiffness it flips the member into having a secondary curvature in the longitudinal direction, i.e. acting to coil the member, and the tension in those fibres is relieved by that layer contracting. A similar effect is produced by the fibres at the extrados face compressing as the tube is opened out, giving rise to a force component in the longitudinal direction in that layer that tends to cause extension in this layer in the longitudinal direction, which again promotes coiling. Thus, due to the orientation of the fibres, as a portion of the slit tube is opened out, it "flips" into a stable coiled form which relieves partially or fully the strains in the fibres and is thus stable. The member is thus reversibly configurable between a stable coiled form and a stable tubular form by progressively flattening and coiling from one end to coil the member, and extending the member from the coil to assume the tubular form.

Figure 2:
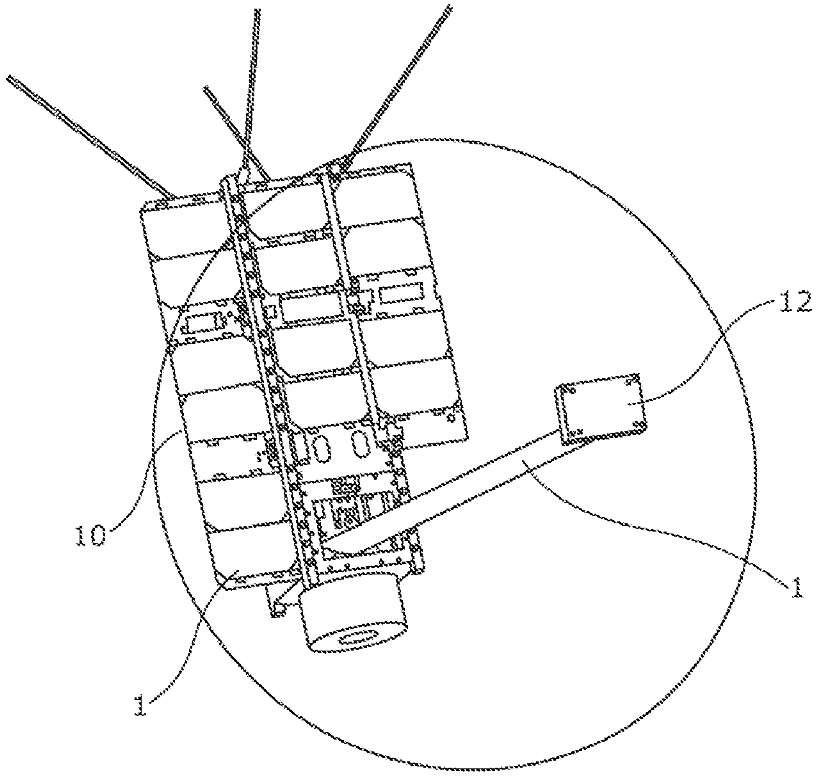
FIG. 2 shows in a perspective view of a deployable boom mechanism incorporating a bistable coilable and extendible member according to an embodiment of the present invention, here embodied in a satellite for deploying a camera payload.

FIG. 2 shows a bistable extendible coilable member 1 operating as a boom, here incorporated into a satellite 10 for deploying equipment 12 when in space. For instance a camera, antenna, PV panels, or other electronic instrument may be attached to the distal end of the member 1. The satellite houses the proximate end, i.e. the coil, and drives the coil to extend the member to deploy the equipment at the desired time. The satellite includes electronics for communicating with the deployed equipment, e.g. data or power.

Figure 3:
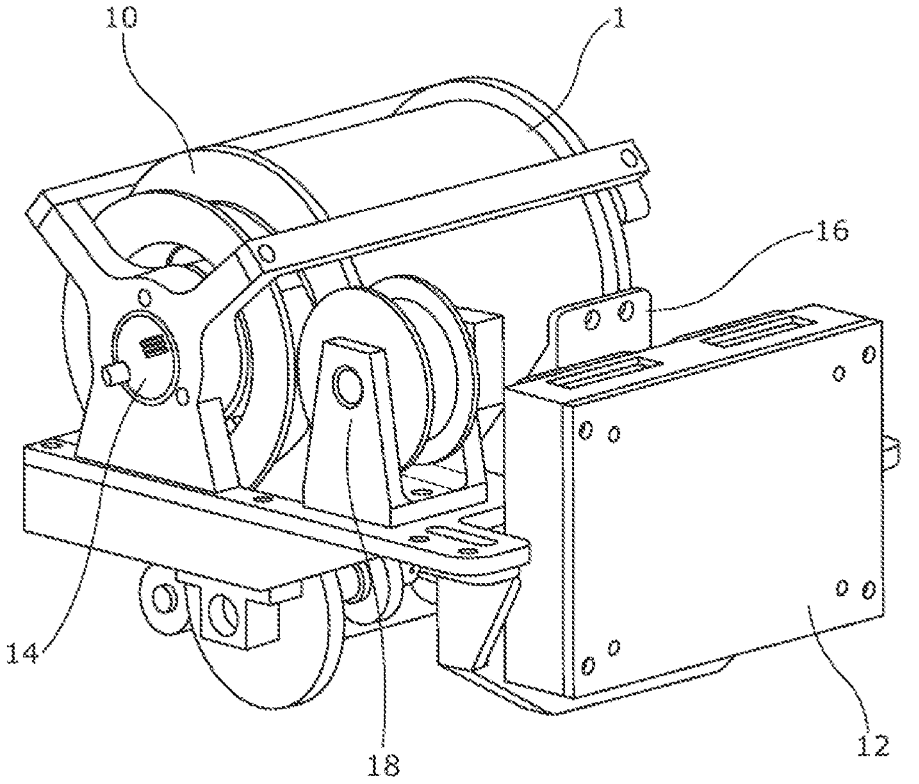
FIG. 3 shows the deployable boom mechanism of FIG. 2 in isolation.

FIG. 3 shows the deployment mechanism in more detail, with drum 14 for holding the coiled member 1 which can be controllably driven to extend it and/or retract it. The deployable boom is Bistable Over the Whole Length (BOWL), which means that restraining structure is not required to keep the boom on the deployment drum. A mounting bracket can be attached to the distal end of the member 1 to which the camera 12 is attached, for example by using a socket which receives and locks in place the end of the STEM member 1. Guide members 18 may be provided to help guide and or support the extendible member 1 as it transitions between the coiled and extended forms. Alternatively, separate pinch wheels or other mechanisms may engage with the member as it comes off the coil to extend/retract it.

It is necessary to provide a wired electrical connection between the electronics at the proximal end, e.g. an onboard computer and/or power supply, and the equipment at the distal end to exchange data and or power. As discussed, this presents challenges in allowing a solution that would allow the wires to be deployed and retracted freely with the boom. Given the potential long length of the boom and the limited space inside the satellite, the wire(s) would either have to be cocoiled with the boom, or stored on a separate spool. Either option then raised the issue of maintaining an electrical connection between the stationary EPS and motor driver board and the rotating end of the wire.

Cocoiling the wires with the boom is the preferred option to limit the number of moving parts and to make efficient use of the volume within the satellite. The design is further optimised by embedding the wires in the extendible member 1.

In this example, the wires to connect the camera with the power supply and On Board Computer are Kapton-covered ribbon cable, although other forms of the electrical conductors are possible.

Figure 4:
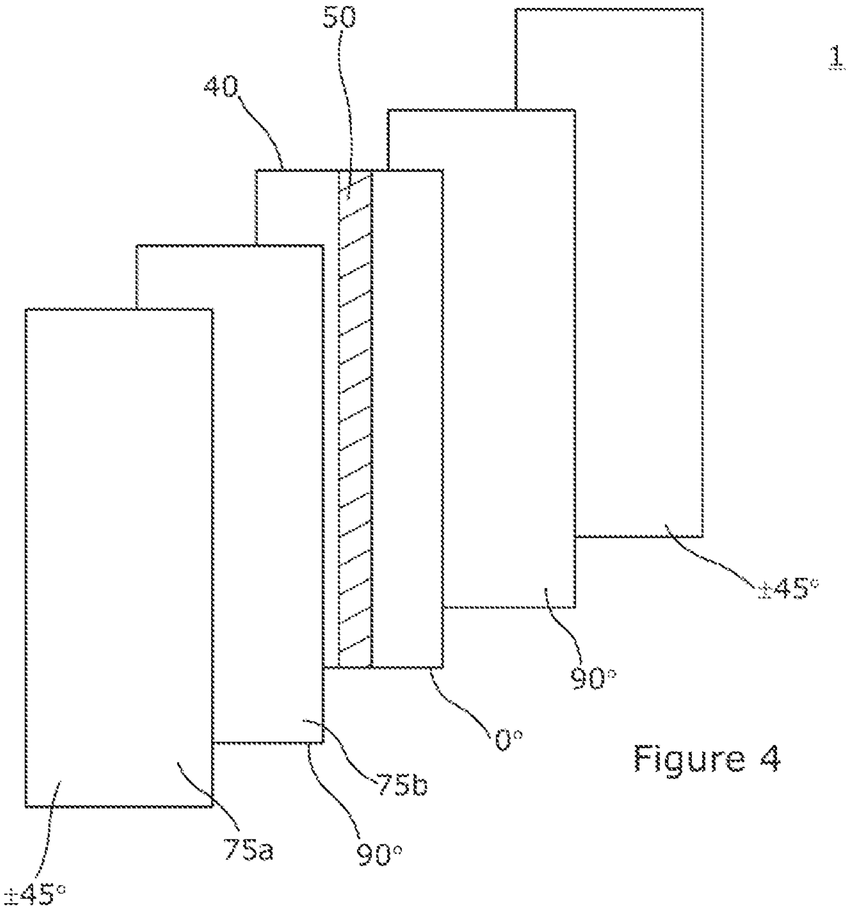
FIG. 4 shows an exploded view of an example layup of fibre reinforcing layers for a bistable member according to an embodiment of the invention, showing a possible positioning of a transmission element, here a ribbon cable, within the layup.

FIG. 4 shows a possible layup of fibre reinforcing layers in the composite laminate member 1 (shown flat and "exploded" for ease of illustration), here being +−45, 90, 0, 90, +−45. The middle layer shows a "zone" 40 where preferably the ribbon cable 50 is deployed. It is preferred that the ribbon cable coincides as closely as possible to the "neutral axis" of the member. It will be appreciated that as the coil forms, the intrados and extrados faces experience respectively negative and positive strains, with a plane within the member experiencing net zero strain. By placing the ribbon cable close to the neutral axis, the ribbon cable experiences less stress and strain which would otherwise risk damaging the cable or the integrity of the member. Generally the neutral axis coincides with the centre of the member, particularly in a symmetrical layup. Thus, in the example of FIG. 4, this typically coincides with the middle 0 degree layer. However, different layups and techniques can cause the neutral axis to move towards either face. NB The +−45 degree layers shown can be separate layers or a single combined layer. Similarly, any individual layers may be consolidated, i.e. knitted or woven layers, or separate.

Figure 5:
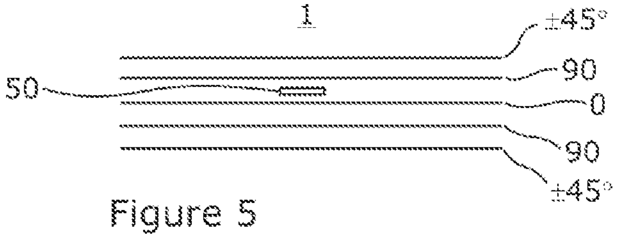
FIGS. 5 to 8 show other example layups in cross section.

FIG. 5 shows in cross section a possible layup where the ribbon cable 50 is between two of the inner layers, being overlayed in zone 40 over the middle 0 degree layer in the layup of the composite, thus placing it close to the neutral axis. This accommodates the bulk of the ribbon cable and helps promote an even thickness member, which has advantages in achieving bistability. If desired, the layup can be selected such that the neutral axis lies between the 0 and 90 degree layers thus coinciding even more closely or exactly with the ribbon cable lying between these layers.

Figure 6:
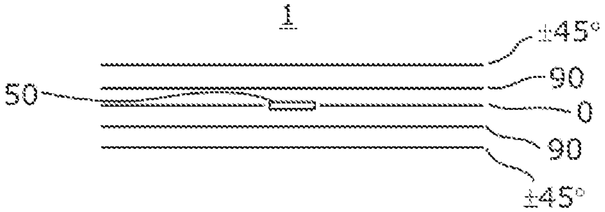

FIG. 6 shows an alternative example where a portion of the fibre in the 0 degree layer is removed from the zone 40 to accommodate the ribbon cable. In effect, the ribbon cable takes the place of the fibre layer in this zone 40, preferably maintaining a regular thickness of the STEM shell across its width. This technique can also be used to avoid changes in stiffness across the width of the member which might affect bistability or stiffness when deployed.

This may be particularly useful with more bulky transmission elements, such as twisted pair wires, or the like, where if required more than one layer can be removed to help accommodate the bulk of the cable and avoid any discontinuities and "bulges" in the thickness of the member due to incorporating the wires into the member.

Figure 7:
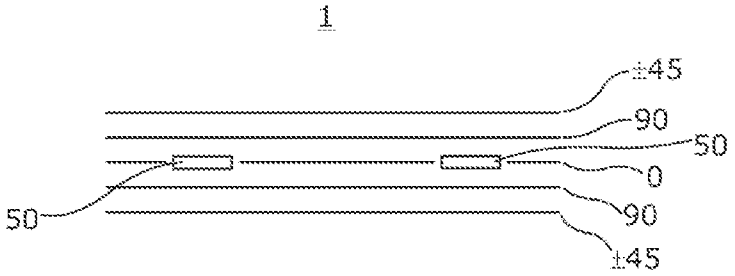

FIG. 7 shows an example where two cut-out sections are provided for two ribbon cables.

Figure 8:
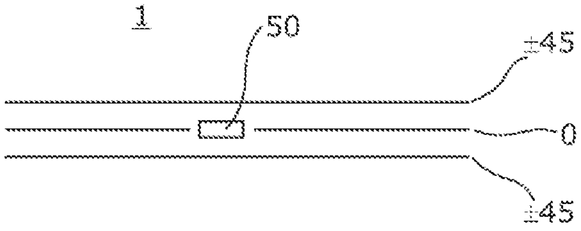

FIG. 8 shows an alternative +−45, 0, +−45 layup with a cut-out section for the ribbon cable.

Any number of ribbon cables or other electrical conductors may be provided. Preferably these are positioned away from the longitudinal edges of the STEM, e.g. no closer than 10% of the overall (flattened) width of the member from the edges. Preferably the overall (flattened) width of the member that accommodates such cable or conductors is no more than 50% of the total width.

If required, the layup of the STEM may compensate for any loss of bending stiffness that may arise through cutting out a portion of the fibre to accommodate the cables. For instance, an additional layer of 0 degree fibre might be introduced, or the angles of the angled ply altered to compensate. Or a substrate on which the electrical conductors are formed may be chosen to match the layer of fibre being removed in its strength and or stiffness, e.g. to +−25%.

This technique is not limited to removing fibre from the 0 degree layer. Fibre could in principle be removed from layers having any orientation of fibre, according to the layup of the product, which may be varied according to the mechanical properties of the mast desired for the intended application. However, in general, it is preferred to remove fibre from a central 0 degree or 90 degree layer, leaving intact the angled ply layers which are responsible for the preferred bistability of the product.

The cut-out generally extends along the entire length of the member. Thus, when laying up the layers in manufacturing the boom, separate strips of 0 degree ply will be placed either side of the ribbon cable in forming that layer. Alternatively, the cut out section may not extend all the way along the member. For example, the cut out section may not extend entirely to the ends of the member, with short bridging sections being kept at those ends. Or a series of cutouts may be provided along the layer in the zone 40 to accommodate most of the bulk of the ribbon cable, say >75%, but not to form two entirely separate portions of fibre, to aid the process of laying up the fibre and aligning it with the ribbon cable and other layers. The wires can be threaded through such cutout sections so as to be interlaced through the layer with cutouts.

Figure 9:
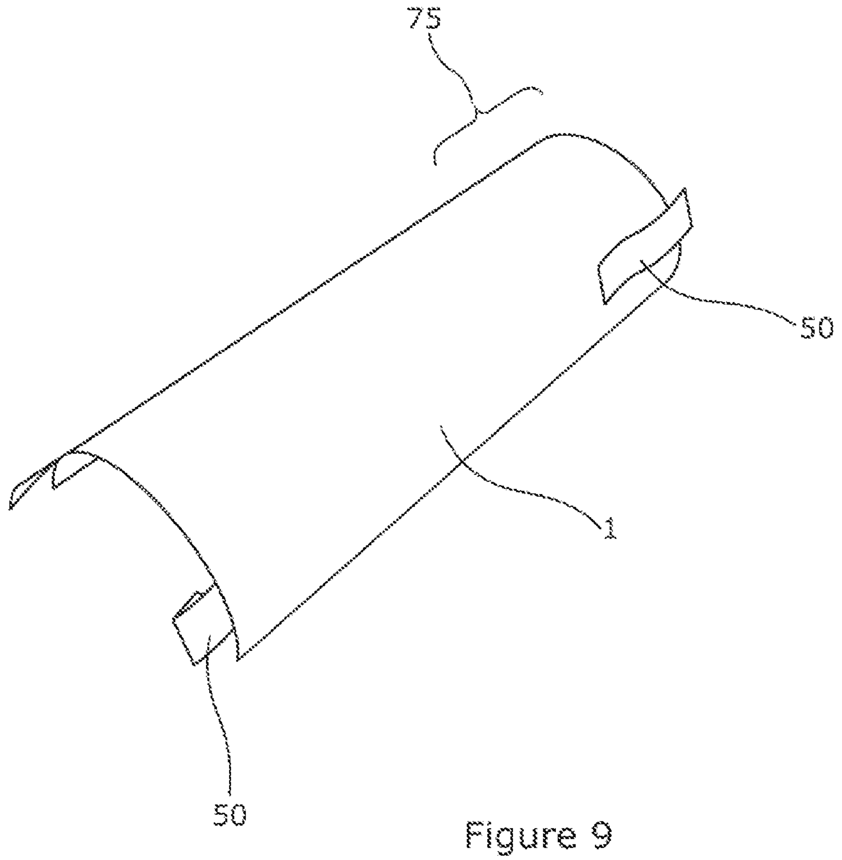
FIG. 9 shows a perspective view of a short section of bistable member showing the ribbon cable exiting the member at the ends.

FIG. 9 shows a short section of bistable member with an embedded ribbon cable 50. At the near end, the ribbon cable exits the end of the member between the full number layers of reinforcing fibre. However, such an abrupt transition may be problematic in some scenarios, as it may cause stress to the ribbon cable moving against a stiff edge of this type (e.g. at either end, but in some examples particularly at the coil end which moves to extend the member and where stresses/strains on the ribbon cable 50 may be expected to increase). Accordingly, as shown in FIGS. 4 and 9, a short section of one or more outer fibre layers 75, 75*a*, 75*b* at the ends may be removed such that the member is “thinner” or tapered in this region. As shown in FIG. 4, the outer two layers 75*a*,75*b* are progressively “stepped” to create a gradual transition at the edge. This gradually decreases the stiffness of the end portion to which the cable is laminated, acting as strain relief as the cable exits the member 1.

As described above, a mounting bracket may be used to interface the device being deployed to the mast. This may have a socket for permanently or reversibly receiving and fixing the end of the mast, e.g. through a bayonet fitting or latching arrangement, and fixtures for attaching to the device. The mounting bracket may also have a connector/terminals for connecting to the ribbon cable 50/conductors and for distributing the signals/power to and from the device via another connector. Electronics may be provided on the mount for signal processing or otherwise interfacing the device to communication via the cable. The socket may therefore have an aperture such that the cable extending from the end of the mast passes through the socket to connect with a connector or otherwise supports, guides and or protects the cable as it exits the mast body and connects to a connector on the mounting block or on the device.

Figure 10:
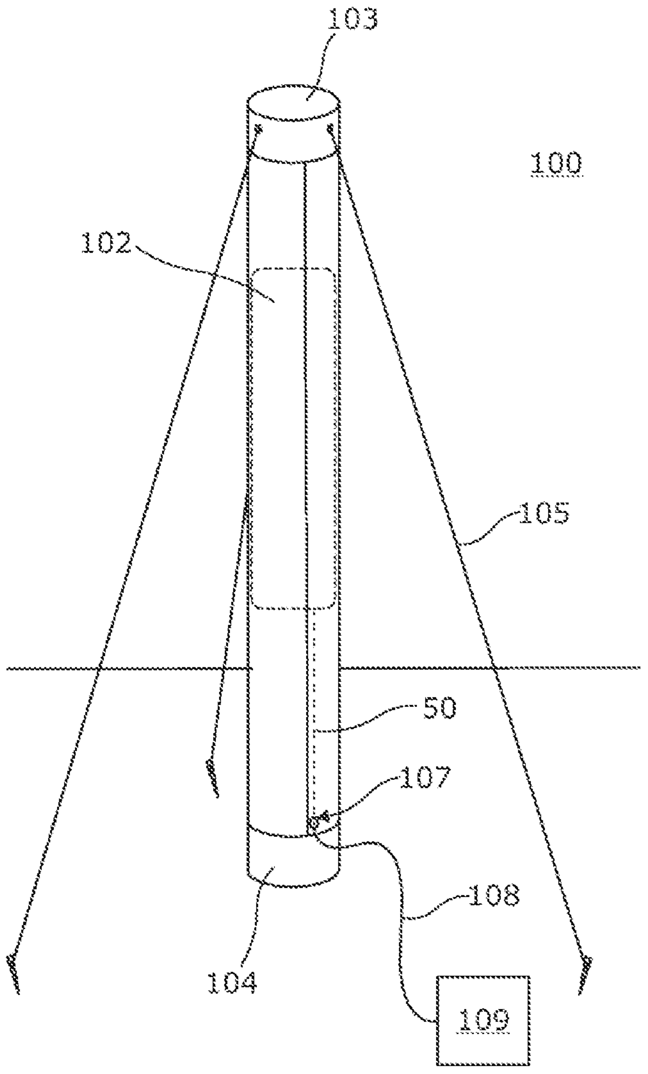
FIG. 10 shows another example of a mast incorporating a bistable member including a transmission or lighting element.

FIG. 10 shows another possible application, where the member 1 incorporates the device being deployed, in this case is employed as an antenna mast 100. The mast incorporates an antenna 102 along its length, possibly integrated with the mast. A user may manually uncoil the mast and erect it to elevate the antenna for transmitting/receiving. Top and bottom caps 103,104 stabilise the member when erected, and guys 105 anchor it in position. The mast 100 similarly includes a STEM member 1 with an integrated ribbon cable 50 or other conductors as described above such that the transmitter/receiver equipment 109 is in electrical connection with the antenna. A lead 108 connects from the equipment 109 to a connector 107 attached to the ribbon cable at the proximate end of the mast.

Similarly, the integrated ribbon cable 50 or other conductors as described above can be used to connect to LEDs or other lighting elements incorporated with the mast, e.g. for display or illumination.

Where the device, e.g. LEDs or antenna, is integrated with the mast, i.e. also between two layers of the laminate, the ribbon cable or other conductors may connect to these devices internally, i.e. without any conductive part being exposed to the surface of the mast along its length, which may be advantageous in protecting the connection from the environment. However, in other embodiments, it may be preferred for the ribbon cable or conductive elements to emerge from the mast to its surface at a point along its length, e.g. through cut-out portions in one or more layers, to allow for connections to be made, e.g. via soldering.

Many other applications of deploying equipment and devices via an extendible mast are possible using the techniques described.

The mast 100 may be provided with a housing (not shown) which contains the coiled mast 100 from which it can be extended wholly or partially. The housing may form a base for supporting the extended antenna assembly when deployed. As will be appreciated many other means are available to provide the housing and drive to the mast 100. The housing may provide complete containment or be composed of rods or rollers arranged around the coil 11, closely enough spaced to prevent it going in between the rods or rollers when in use, but thus reducing friction on the surface of the coil. Alternatively a rotatable drum or reel may be provided, which may be driven or manually actuated as desired.

Such a housing may comprise a rotatable connector aligned with the axis about which the member coils which is connected by a length of cable 22 to the cable 18 within the pocket of the member 2. This allows the mast 1 to coil without the cable 8 being twisted, which may be undesirable and lead to damage of the cable where for example the degree of rotation is large or the cable 8 is stiff or delicate. Suitable rotatable connectors for electrical connectors or fluid connections are known per se and are not described in detail herein.

In an alternative arrangement for managing the connection to the transmission element at the coiled end 1*b* of the mast 1, a length of the transmission element is coiled beyond the near end 2*b* of the STEM member 2 and terminated to a hub lying inboard of the internal diameter of the coiled STEM member 2. As the STEM member 2 is extended, the extra length of the transmission element will tend to coil towards the hub 19, as it is retracted it will tend to uncoil to its original diameter. In other words, the extra length forms a coil which becomes tighter when the mast 1 is extended and looser when the mast 1 is retracted (in the manner of a hairspring “breathing” in a mechanical watch or clock as the balance rotates to and fro). In this manner a connection can be made that is non-rotating at the hub and provides electrical continuity. In other applications, the connection at the distal end of the mast may be made after the mast is extended, e.g. via inserting a plug into a connector mounted to the mast connected to the transmission element, or vice versa.

As previously described, the mast 1 can be used to deploy other apparatus than antennas which require other flexible transmission elements than cables. It will be appreciated that the principles described in relation to antennas and cables apply to these other scenarios.

The flexible transmission element 18 may comprise a ribbon cable, i.e. a unitary arrangement of parallel wires in a flat insulating housing or a flexible substrate with metallic traces printed on it, twisted pair wires, single wires or cables, a co-axial cable or cables or other arrangements of one or more conductive elements for transmission of electrical power, data, or control signals. Additionally or alternatively, the transmission element may provide fibre optic means for optical communications with the apparatus. Additionally or alternatively, the transmission element may provide a hose for transmitting a fluid, gel or particular matter to the apparatus. For instance, the transmission element 18 may comprise a hose for providing hydraulic power to the apparatus 6. The transmission element may comprise a hose for providing liquid or gaseous fuel to the apparatus.

Preferably the transmission element has an outer surface that bonds well with the matrix material of the composite in order to promote a strong laminate. For instance, PTFE coated cables would avoided, in favour of Kapton type materials, e.g. flexible tapes having a large range of temperature stability and electrical isolation ability, providing an insulation and protection layer on electrostatic-sensitive and fragile components, and/or good bonding properties in thermoplastic/set polymer based composites. If required, the transmission element may be coated with a substance before consolidation to promote good bonding.

The mast may be manufactured by laying up the layers of fibre, e.g. pre-preg, and transmission element in a mould or on a former, before applying heat and/or pressure to consolidate and cure the matrix material to form the composite product or by a continuous forming process where the components of the mast are continuously fed into an apparatus that applies heat and/or pressure to consolidate and form the components into the final composite as they pass through the apparatus, for instance as disclosed for example in the Applicant's U.S. Ser. No. 10/124,545B2 the entire contents or which are hereby incorporated in their entirety.

Thus, to deploy the equipment it is simply necessary to extend the mast from the coil, either manually or driven, to position the equipment carried by the mast. In some cases the equipment will already be mounted to the mast or permanently attached and connected to the transmission element at the distal end of the mast. In other cases, the equipment will first need to be mounted and a connection made to the transmission element. Similarly, the mast may be permanently attached to the equipment at the proximal, coil end with a connection already made to the transmission element, or the user may have to manually made this connection at the same time as deploying the mast.

Embodiments of the present invention have been described with particular reference to the example illustrated. However, it will be appreciated that variations and modifications may be made to the examples described within the scope of the present invention.

The invention claimed is:

1. An extendible mast for deploying equipment, comprising:

a composite member formed from plural fiber reinforced layers laminated together in a matrix material in the form of a shell that is constructed and arranged so as to be configurable between a coiled form and an extended form, wherein when extended the composite member is resiliently biased in the form of an elongate tube having a slit along the length of the tube, the slit formed by longitudinal edges of the composite member and wherein when coiled the composite member is opened out at the longitudinal edges to a flattened form and wound about an axis extending transversely to the longitudinal extent of the composite member; and, one or more electrical conductors extending along at least part of the longitudinal extent of the composite member for making connection to the equipment, wherein the one or more electrical conductors are integrated between two or more layers within the laminate, wherein one or more layers of fiber has a cut-out portion or portions along the length of the extendible mast to accommodate some or all of the one or more electrical conductors.

2. The extendible mast according to claim 1, wherein the one or more electrical conductors are positioned at or near the neutral axis of the extendible mast.

3. The extendible mast according to claim 1, wherein the one or more layers of fibers having a cut-out portion or portions is 0 or 90 degree orientation fiber.

4. The extendible mast according to claim 1, wherein the layup is, in order, one or more outer layer having angled fiber, one or more inner layers having 0 or 90 degree fibers, and one or more inner layers having angled fiber.

5. The extendible mast according to claim 1, wherein there are plural 0 or 90 layers, and at least one of the one or more electrical conductors is encased between at least two such layers.

6. The extendible mast according to claim 1, wherein an inner or outer layer has an aperture to allow at least one of the one or more electrical conductors to emerge from the body of the mast partway along the mast's length.

7. The extendible mast according to claim 1, wherein the fiber layup of the extendible mast is modified at one or both ends compared with a main middle section of the extendible mast to locally decrease the stiffness of the extendible mast in a region where the one or more electrical conductors leaves the mast providing strain relief to the at least one of the one or more electrical conductors.

8. The extendible mast according to claim 1, wherein at least some of the one or more electrical conductors are a ribbon cable.

9. The extendible mast according to claim 1, wherein the at least some of the one or more electrical conductors are a twisted pair or cable.

10. The extendible mast according to claim 1, wherein at least one of the one or more electrical conductors is coated with a substance to promote bonding with the matrix material of the composite member.

11. The extendible mast according to claim 1, wherein the one or more electrical conductors are not closer to the edge of the composite member than 10% of the overall flattened width or the overall width of the one or more electrical conductors is not more than 50% of the overall width of the composite member.

12. The extendible mast according to claim 1, wherein the equipment deployed by the extendible mast or integrated within the extendible mast is a camera, sensor, PV panel, antenna, lighting system, communication equipment or any combination thereof.

13. The extendible mast according to claim 1, wherein a distal end of the extendible mast has a mount adapted to attach to a tool or other device, optionally having a socket for receiving and fixing the distal end of the extendible mast and optionally having means for attaching to the one or more conductors in the extendible mast.

14. The extendible mast according to claim 1, further comprising a connector on the extendible mast for externally connecting to at least one of the one or more electrical conductors, wherein optionally:

the connector is a rotatable connector or a length of the at least one of the one or more electrical conductors extends beyond a coiled end of the composite member and is in communication with the connector, wherein said length of the at least one of the one or more electrical conductors forms a coil and wherein the tightness of the coil changes as the extendible mast is extended and retracted such that an electrical connection can be maintained during the rotation of the extendible mast whilst the mast is coiled and uncoiled.

15. The extendible mast according to claim 1, wherein the composite member comprises a bistable material.

16. An extendible mast according to claim 1, comprising a housing for containing the mast in the coiled form and guiding the extendible mast as it is extended.

17. An extendible mast for deploying equipment, comprising:

a composite member formed from plural fiber reinforced layers laminated together in a matrix material in the form of a shell that is constructed and arranged so as to be configurable between a coiled form and an extended form, wherein when extended the composite member is resiliently biased in the form of an elongate tube having a slit along the length of the tube, the slit formed by longitudinal edges of the composite member and wherein when coiled the composite member is opened out at the longitudinal edges to a flattened form and wound about an axis extending transversely to the longitudinal extent of the composite member; and, one or more transmission elements extending along at least part of the longitudinal extent of the composite member for making connection to the equipment, wherein the one or more transmission elements are between two layers within the laminate and wherein at least one layer of the laminate is at least partially removed to accommodate at least one of the one or more transmission elements, wherein at least one of the one or more the transmission elements is one or more of electrical conductor for data and at least one of a power, an optical fiber element, a hose for fluid flow.

18. A method of deploying equipment using the extendible mast of claim 1, the method comprising:

at least one of extending and retracting the extendible mast, the extendible mast supporting and/or positioning an apparatus; and providing services to the apparatus via the one or more electrical conductors.

* * * * *